Aug. 11, 1970 K. H. SENNOWITZ 3,524,037
FAIL TRANSISTOR PROTECTIVE CIRCUIT FOR ELECTRICAL DISCHARGE MACHINING APPARATUS
Filed Jan. 22, 1968
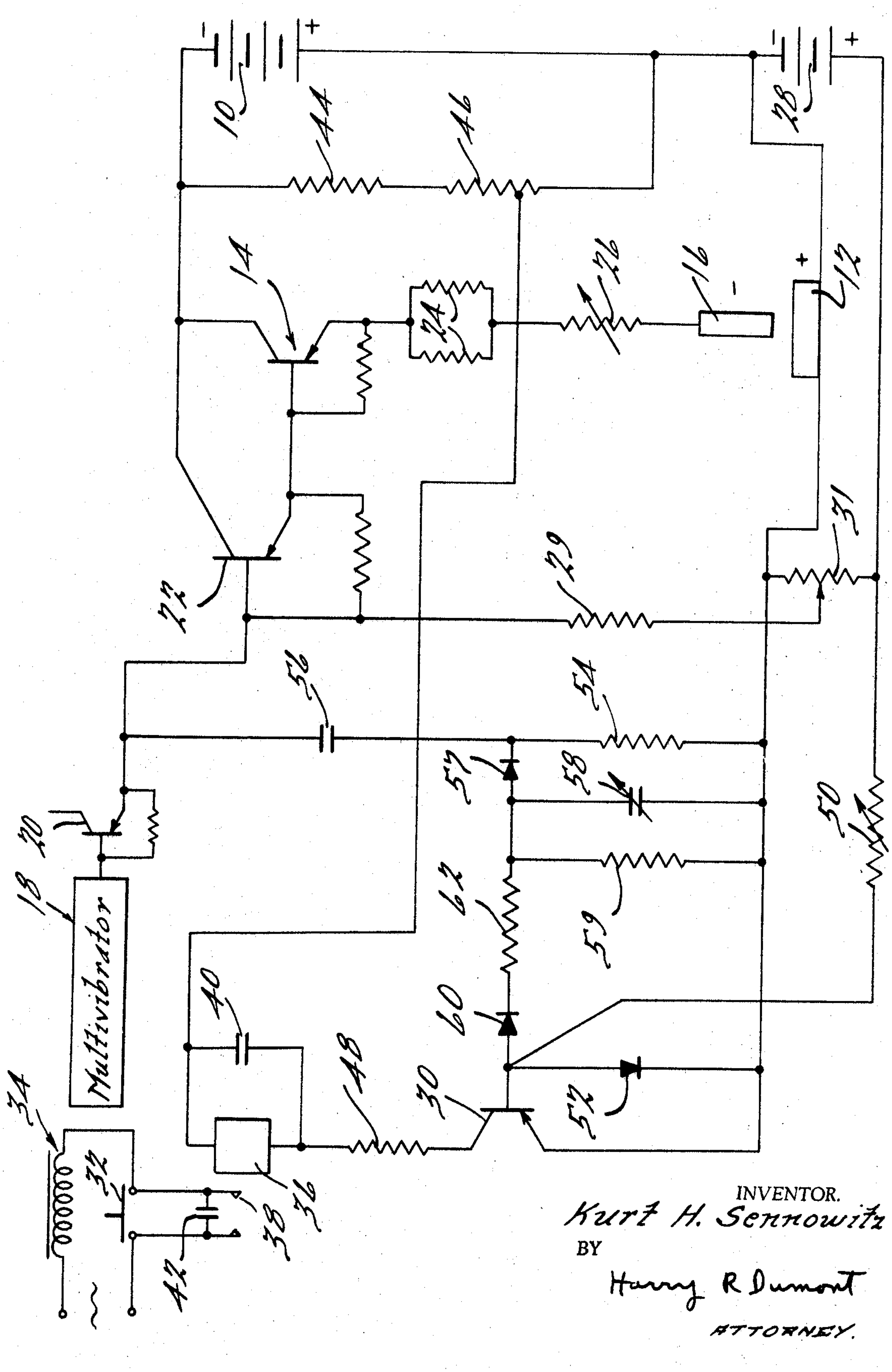
INVENTOR.
Kurt H. Sennowitz
BY
Harry R Dumont
ATTORNEY.

3,524,037

FAIL TRANSISTOR PROTECTIVE CIRCUIT FOR ELECTRICAL DISCHARGE MACHINING APPARATUS

Kurt H. Sennowitz, Royal Oak, Mich., assignor to Elox Inc., Troy, Mich., a corporation of Delaware Filed Jan. 22, 1968, Ser. No. 699,446
Int. Cl. B23p *1/04, 1/08*
U.S. Cl. 219—69 2 Claims

ABSTRACT OF THE DISCLOSURE

An EDM circuit with a protective circuit for preventing damage to electrode or workpiece due to any one of the following conditions occurring: output transistor failure, drive signal loss, multivibrator failure or failure of any DC supply. A multivibrator provides triggering pulses to an electronic switch connected in series with a DC power source, the EDM gap, and a cut-off relay. A detecting means responsive to a drop in the strength of the triggering pulses below a preselected value trips the cut-off relay.

BACKGROUND OF THE INVENTION

The field to which my invention relates is that known as electrical discharge machining in which material is removed from an electrically conductive workpiece by the action of relatively high power machining pulses passed between a tool electrode and the workpiece. To provide operation over a necessarily broad range of frequencies and pulse "on-off" times, power supplies of the advanced types employed include a bank of transistors or similar type devices which are operated as a switch between a DC power supply and the machining gap. These transistors are operated in unison by a variable frequency pulser or multivibrator. It is necessary to provide for power interruption in response to failure of the various electronic switching devices or power supplies in a manner timely to prevent damage to the gap elements, i.e, tool electrode or workpiece.

SUMMARY OF THE INVENTION

My invention provide for a fail transistor protective circuit which responds to prevent damage to the gap elements. This protective action is effective over a broad range of frequencies and over a drive signal range from 5% to 95% and more on-time.

DESCRIPTION OF THE DRAWING

The figure of the drawing is a schematic diagram of the circuit.

The drawing shows the basic elements of a transistorized electrical discharge machining apparatus incorporating my protective circuit. These elements include the main power supply 10 having its positive terminal connected to the workpiece 12 and its negative terminal connected through output transistor 14 to the electrode 16. While my invention is illustrated and described in terms of a transistor type EDM power supply, it is not so limited. It is applicable to any EDM power supply in which a periodically operated electronic switch or electronic switch bank is used to provide machining power pulses to the gap. By "electronic switch" is meant any electronic control device having three or more electrodes comprising at least two principal or power electrodes acting to control current flow in the power circuit, the conductivity between the power electrodes being controlled by a control electrode within the switch whereby the conductivity of the power circuit is controlled statically or electrically without the movement of mechanical elements within the switch. Included within this definition are vacuum tubes and transistors in which the turn-on is accomplished by a control voltage applied to the control electrode and in which turn-off is accomplished automatically in response to the removal of that control voltage.

A multivibrator 18 is used to generate triggering pulses. Multivibrator 18 may be of any suitable type to provide high frequency, variable on-off time operation of the supply. Several examples of suitable multivibrators are shown and described in Lobur U.S. Pat. No. 3,243,567 entitled "Electrical Discharge Machining Apparatus" issued on Mar. 29, 1966. Intermediate drive stages are provided between multivibrator 18 and transistor 14 through transistors 20 and 22 as shown. Transistor 14 has a parallel resistor 24 and variable resistor 26 connected in series between its emitter and electrode 16 for controlling the magnitude of machining current being provided to the gap. A bias source 28 is included as required for the operation of transistors 14 and 22 and cut-off control transistor 30. The bias for transistor 14 and 22 is provided by fixed resistor 29 and potentiometer 31. The AC input to the circuit is indicated in the upper left hand portion of the drawing. A "start" button 32 is shown together with the transformer primary 34 from which is derived the main power supply 10 by the full wave rectifier and filter networks as well known to the art. The cut-off means itself is incorporated as a relay including coil 36 together with its movable contacts 38. Relay coil 36 has a capacitor 40 connected across its terminals to filter and stabilize the voltage across it during its operation. A capacitor 42 is connected across contacts 38 to prevent contact arcing. Relay coil 36 further has its upper terminal connected to a negative voltage derived from DC source 10 by a network including resistor 44 and the variable resistor of potentiometer 46. Current flow to the lower terminal of relay coil 36 is through transistor 30 and current limiting resistor 48. The turn-off sensitivity of transistor 30 is controlled by variable resistor 50 connected between bias source 28 and the base of transistor 30. Diode 52 is connected across the base and emitter of transistor 30 to limit its off-time voltage. A detecting means is connected to the drive signal output of transistor 20. The detecting means comprises a network including resistor 54 connected at its upper terminal to the drive signal through coupling capacitor 56. The lower terminal of resistor 54 is coupled to the plus gap terminal-workpiece 12. Connected in shunt with resistor 54 is the network including diode 57 and variable capacitor 58 with resistor 59 coupled across capacitor 58. Diode 60 and current limiting resistor 62 are further connected in series with the base of transistor 30 to provide a control signal thereto.

DESCRIPTION OF OPERATION

The function of the present invention is to prevent damage to electrode or workpiece due to transistor failure, drive signal loss, failure of the multivibrator or pulse or failure of any of the DC supplies in the circuit. In the operation of the protective circuit, since only one output bank transistor such as transistor 14 can short circuit at one time, the main supply 10 will be turned off through the operation of the cut-off means, relay 36, before a second transistor shorts. It should be noted that in typical commercial power supplies, as many as forty or more transistors 14 may be connected in a parallel bank to provide the current levels required for large cavity machining. In the absence of an adequate protective circuit, the gap elements, electrodes 16 and workpiece 12 would be severely damaged if DC current were drawn through a shorted output transitor for an appreciable time. The circuit of my invention is further failure safe in that the main power supply 10 cannot be turned on in case of major circuit component failure. The main circuit is used to energize the relay coil through transistor 30 which in turn must get its own turn-on signal from the drive signal that turns on the output transistors or transistor 14.

The sequence of operation is as follows:

The "start" button 32 turns on the main supply momentarily to energize relay 36 and to pass current through control transistor 30. Current flow is through the power electrodes of transistor 30, current limiting resistor 48 and relay coil 36 to the negative voltage preset on potentiometer 46. At the same time capacitor 56 is coupling the drive signal and storing it through diode 57 across capacitor 58 and resistor 59. The rectified minus voltage signal is transferred through limiting resistor 62 and diode 60 to the base of transistor 30 to turn it "on." So long as the circuit is in proper operation, transistor 30 will be maintained in its conductive state to hold relay 36 energized. Resistor 50 may be adjusted to insure transistor 30 turn-off in case of failure of drive signal. The sensitivity of transistor 30 during normal cutting operation is set by resistor 50 to turn off the main power supply before an output transistor 14 actually fails short. During an increase from 85 to 95% on-time operation, for example, the bias turn-off current must be lowered to prevent transistor 30 turn-off during normal cutting or gap open circuit. A major feature of my invention is its arrangement and capability of operating over a broad range of machining pulse on-time, i.e., from less than 5% to more than 95% on-time.

It will thus be seen that I have provided an improved circuit for an electrical discharge machining apparatus.

I claim:

1. Apparatus for machining a conductive workpiece by means of electrical discharges across a dielectric coolant filled gap between a tool electrode and a workpiece including a source of machining power, an electronic switch having a control electrode and a pair of power electrodes, said power electrodes connected between said power source and said gap for providing machining pulses thereto wherein the improvement comprises a drive signal means connected to said control electrode of said switch for rendering it alternately conductive and non-conductive, a cut-off means operatively connected to said source, said cut-off means comprising the coil of a relay having its contacts operatively connected to and controlling the output from said source, and a detecting means operatively connected between said drive signal means and said cut-off means for initiating its operation responsive to drop of drive signal below a predetermined level, said detecting means comprising a resistor connected between the output of said drive signal means and said gap and a diode-capacitor network connected across said resistor.

2. The combination as set forth in claim 1 wherein a cut-off electronic switch is connected with its control electrode connected to said diode-capacitor network, its power electrodes coupled between a voltage source and one terminal of said relay coil, said coil having its other terminal connected to a different bias voltage source.

References Cited

UNITED STATES PATENTS 2,866,921 12/1958 Matulaitis et al.

RALPH F. STAUBLY, Primary Examiner